(12) United States Patent
Heierli et al.

(10) Patent No.: US 8,081,359 B2
(45) Date of Patent: Dec. 20, 2011

(54) ANTI-COUNTERFEIT SECURITY AND METHODS FOR ITS PRODUCTION AND VERIFICATION

(75) Inventors: Rene Heierli, Winterthur (CH); Martin Eichenberger, Zollikon (CH)

(73) Assignee: KXO AG, Zug (CH)

( * ) Notice: Subject to any disclaimer, the term of this patent is extended or adjusted under 35 U.S.C. 154(b) by 907 days.

(21) Appl. No.: 11/629,901

(22) PCT Filed: Jun. 30, 2004

(86) PCT No.: PCT/CH2004/000415
§ 371 (c)(1),
(2), (4) Date: Aug. 27, 2007

(87) PCT Pub. No.: WO2006/002552
PCT Pub. Date: Jan. 12, 2006

(65) Prior Publication Data
US 2008/0130074 A1    Jun. 5, 2008

(51) Int. Cl.
*G03H 1/00* (2006.01)
(52) U.S. Cl. .............................................. 359/2; 283/86
(58) Field of Classification Search ......... 359/2; 283/86
See application file for complete search history.

(56) References Cited

U.S. PATENT DOCUMENTS

| | | | | |
|---|---|---|---|---|
| 4,563,024 A * | 1/1986 | Blyth | ............................. | 283/91 |
| 5,101,184 A | 3/1992 | Antes | | |
| 6,036,232 A | 3/2000 | Kaule et al. | | |
| 6,066,378 A | 5/2000 | Morii et al. | | |
| 6,337,752 B1 | 1/2002 | Heckenkamp et al. | | |
| 6,471,247 B1 | 10/2002 | Hardwick et al. | | |
| 6,474,695 B1 | 11/2002 | Schneider et al. | | |
| 6,482,489 B1 | 11/2002 | Otaki et al. | | |
| 6,747,768 B1 | 6/2004 | Knocke et al. | | |
| 7,085,024 B2 * | 8/2006 | Ishimoto et al. | ................. | 359/2 |
| 2002/0191234 A1 | 12/2002 | Ishimoto et al. | | |
| 2003/0129345 A1 | 7/2003 | Morii et al. | | |
| 2007/0297211 A1 | 12/2007 | Ehreke et al. | | |

FOREIGN PATENT DOCUMENTS

| | | |
|---|---|---|
| CA | 2247974 | 5/1990 |
| CA | 2247974 | 5/1999 |
| DE | 102 23 156 A1 | 12/2003 |
| DE | 102 34 431 A1 | 2/2004 |

(Continued)

OTHER PUBLICATIONS

Markov, V., et al. "Volume hologram with random encoded reference beam for secure data encryption." in *Optical Security and Counterfeit Deterrence Techniques III* (San Jose, California) vol. 3973 (2000) pp. 266-275.

(Continued)

*Primary Examiner* — Alessandro Amari
(74) *Attorney, Agent, or Firm* — Ladas & Parry LLP

(57) ABSTRACT

The security object comprises a substrate, a surface structure and a hologram layer. A volume hologram is arranged in the hologram layer. The hologram layer is deformed in homogeneously by the surface structure, which gives rise to readily detectable changes in the reflections from the volume hologram. These changes can be used to verify the authenticity of the object. The surface structure can e.g. be applied using intaglio printing techniques or embossing. Alternatively or in addition to the deformation of the hologram layer by means of the surface structure, the hologram layer may also be deformed by embossing.

17 Claims, 2 Drawing Sheets

FOREIGN PATENT DOCUMENTS

| | | |
|---|---|---|
| EP | 0 919 961 B1 | 6/2003 |
| GB | 2 267 357 | 12/1993 |
| JP | 6-332356 A | 12/1994 |
| JP | 10-133552 A | 5/1998 |
| WO | 95/21747 | 8/1995 |
| WO | 01/00418 | 1/2001 |
| WO | 01/54077 A1 | 7/2001 |
| WO | 02/02351 | 1/2002 |
| WO | 02/03323 | 1/2002 |
| WO | 2005/091085 A1 | 9/2005 |
| WO | 2005/105478 A1 | 11/2005 |

OTHER PUBLICATIONS

Espacenet English abstract of JP 6-332356 A.
Espacenet English abstract of JP 10-133552 A.

* cited by examiner

ANTI-COUNTERFEIT SECURITY AND METHODS FOR ITS PRODUCTION AND VERIFICATION

TECHNICAL FIELD

The invention relates to an anti-counterfeit security object and a method for producing such a substrate. It also relates to a method for verifying the authenticity of such an object. The security feature comprises a hologram layer with a volume hologram.

BACKGROUND ART

Security objects of this type may e.g. be bank notes, passports, credit cards, identity cards, packages or tags for valuable goods, data carriers, letterheads, etc. Such objects are often equipped with security features with the purpose to make counterfeiting difficult.

Security features based on holograms are widely known. While most of these features are using surface holograms (e.g. diffraction gratings having a depth in the order of only one or a few wavelengths), "volume holograms" have also been proposed for such applications, see e.g. EP 1 091 267. Volume holograms have gratings of a depth that is much larger than the wavelength of visible light, e.g. a depth of at least 10 µm, advantageously at least 50 µm. They can have high diffraction efficiencies, generate powerful images and have well-defined diffraction angles and wavelengths.

With the increasing skill of counterfeiters, a further improvement of such security objects is desired. Also, it is desired that the security objects have characteristics that makes them easy to be verified.

DISCLOSURE OF THE INVENTION

Hence, it is a general object of the invention to provide a security object that provides strong anti-counterfeiting protection and/or that is easy to verify.

Now, in order to implement these and still further objects of the invention, which will become more readily apparent as the description proceeds, the method for manufacturing an anti-counterfeit security object comprises the steps of creating a volume hologram in a hologram layer, applying the hologram layer to a substrate, and non-homogeneously deforming the hologram layer thereby deforming the volume hologram.

In a second aspect, the invention relates to an anti-counterfeit security object comprising a substrate, and a hologram layer with a volume hologram, wherein said hologram layer is arranged on a surface of said substrate, wherein said volume hologram comprises inhomogeneous deformations caused by deformations of said hologram layer.

In a last aspect, the invention relates to a method for verifying the authenticity of the security object of the second aspect, said method comprising the steps of illuminating said volume hologram for generating a reflected light field, checking for the presence of at least one property of said reflected light field caused by said inhomogeneous deformations, and negating the authenticity in the absence of said property.

In this context, a "non-homogeneous" deformation is a deformation that does not affect the whole hologram in the same manner. Advantageously, the hologram is deformed locally, i.e. only in certain areas of the hologram.

The deformation of the hologram leads to a change in the length and/or direction of the local grating vector of the volume hologram, which in turn affects the conditions (wavelength and angle) under which light is scattered. Hence, the deformation can be easily recognized by optical inspection of the hologram. Since the wavelength and angle selectivity in volume holograms is much higher than in surface holograms, deformations become much more apparent in the former.

The steps of applying the hologram layer to the substrate and of deforming the same can be carried out simultaneously or subsequently.

In one advantageous example, the hologram layer is applied over a surface structure of the substrate, said surface structure comprising edges of a height of at least 10 µm, advantageously at least 30 µm, and leading to a deformation of the hologram. An "edge" in this sense is understood to be any variation in height with a slope angle of at least 10°, in particular at least 30°.

In addition or alternatively to applying the hologram layer over a surface structure, the hologram layer can be deformed by embossing it, either at room temperature or at elevated temperature. In this respect, the term "embossing" designates any non-homogeneous deformation by applying a non-homogeneous pressure by means of a hard, object, which object is removed after deforming the hologram layer.

In an advantageous embodiment, at least part of the deformations are applied to areas of the volume hologram where the same is, without deformation, visually substantially homogeneous, e.g. in areas where the length and direction of its local grating vector varies only slowly prior to deformation and much faster after deformation. In that case, the deformations can be recognized easily.

The invention can be applied to any type of security objects. In an advantageous application, the security object is a bank note, but it can also be a passport, credit card, brand label or any of the security objects mentioned above.

BRIEF DESCRIPTION OF THE DRAWINGS

The invention will be better understood and objects other than those set forth above will become apparent when consideration is given to the following detailed description thereof. Such description makes reference to the annexed drawings, wherein.

MODES FOR CARRYING OUT THE INVENTION

Figure 1:
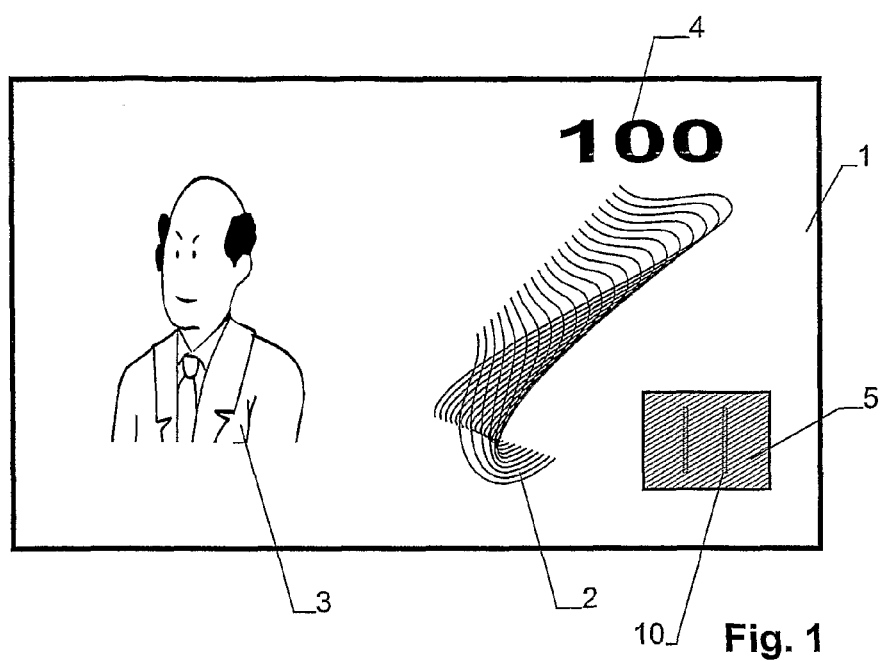
FIG. 1 is a top view of a bank note with a hologram layer attached thereto.

FIG. 1 shows, as one embodiment of the security object according to the present invention, a bank note 1 having conventional imprinted or otherwise applied security features 2, images 3 and value information 4. In addition, bank note 1 carries one or more hologram layers 5.

Figure 2:
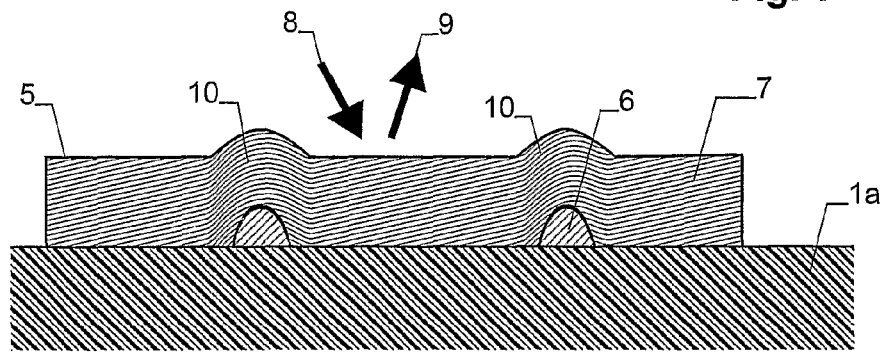
FIG. 2 is a schematic sectional view through a hologram layer and part of the substrate with a surface structure.

FIG. 2 shows a sectional view through hologram layer 5 and the underlying bank note substrate 1a. In this embodiment, a surface structure 6 comprising two "bumps" is arranged on top of substrate 1a. Hologram layer 5 is non-homogeneously deformed to match with the two bumps.

Figure 3:
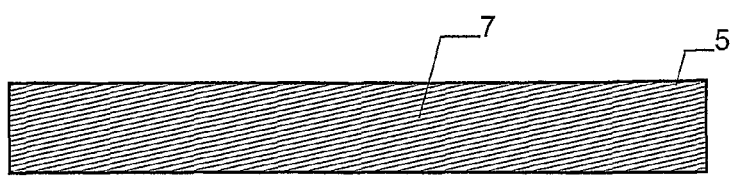
FIG. 3 is a sectional view of the hologram layer of FIG. 2 prior to deformation.

The security object of FIG. 2 is manufactured as shown in FIG. 3.

In a first step, a volume hologram 7 as shown in FIG. 3 is prepared in hologram layer 5, separate from bank note 1. Advantageously, hologram layer 5 is a transparent, thermoplastic foil of homogeneous thickness comprising photosensitive material. Volume hologram 7 is written into hologram layer 5 by means of e.g. two coherent light beams impinging from opposite sides onto hologram layer 5. After exposure, the hologram is stabilized for making it light resistant. Suitable materials and methods are known to the person skilled in the art and are e.g. described in WO 03/036389 by Xetos AG, Germany.

Before applying hologram layer 5 of FIG. 3 to substrate 1a, surface structure 6 is applied to the surface of the substrate.

Such a surface structure (or at least a part thereof) can e.g. be formed by embossing substrate 1a. Alternatively or in addition thereto, material for forming the structure can be applied locally to the flat surface of substrate 1a, e.g. by applying the material using intaglio printing. Any other technique, such as other printing techniques, allowing to apply a readily deformable material to substrate 1a in the form of a structure and then hardening it can be used as well.

Figure 4:
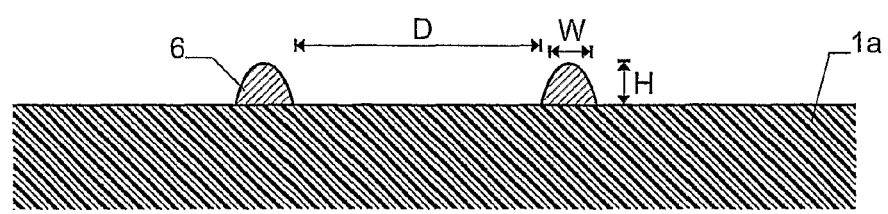
FIG. 4 is a sectional view of the substrate with its surface structure prior to application of the hologram layer.

In the embodiment of FIG. 4, intaglio printing is used and the bumps of surface structure 6 are formed by dye or a hardenable, transparent material.

It must be noted that intaglio printing is a technique commonly applied in the production of security documents, and therefore the process for forming surface structure 6 is readily incorporated into security printing lines.

Once that surface structure 6 is in place and hardened, hologram layer 5 can be applied thereto, e.g. using a glue or hot melt techniques.

Advantageously, hologram layer 5 is heated in order to raise its temperature for softening it when it is in contact with surface structure 6 and substrate 1a, thereby encouraging deformation against surface structure 6. In addition or alternatively to a thermal treatment, pressure can be applied to hologram layer 5 in order to induce deformations.

The volume hologram in hologram layer 5 can be a phase and/or an absorption hologram. It is oriented such that it scatters at least part of the light 8 impinging on the top surface of hologram layer 5 back as reflected light 9 (see FIG. 2), thus allowing an observer to view the reflected light 9.

As mentioned, layer 5 is deformed to fit over the bumps of surface structure 6, which leads to local distorted regions 10 in volume hologram 7, where the grating spacing and orientation of volume hologram 7 is different from what it was prior to distortion.

In order to be scattered, the direction and wavelength of an incoming light beam 8 must be matched to the local grating spacing and orientation of volume hologram 7. Hence, the reflection conditions change in the distorted regions 10.

To illustrate this, we assume that the original volume hologram prior to deformation, i.e. in the state as shown in FIG. 3, was a homogeneous grating with constant spacing and orientation. When deforming this hologram layer against surface structure 6 and viewing it under diffuse, white light illumination, the light reflected from the distorted regions 10 will have different color and intensity than the light reflected from the rest of the hologram.

In order to produce such visible effects, the height H of the bumps (see FIG. 4) can be fairly small, typically at least 10 μm, e.g. in the order of 30 μm. For strong results, the height advantageously exceeds 70 μm and the edges of the bumps should have a slope angle of at least 20°.

In order to create a strong deformation of hologram layer 5, an advantageous embodiment of surface structure 6 comprises elevations having, at least in one direction, a width W not exceeding 1 mm, preferably not exceeding 300 μm. The height H of the edges of the elevations should be as described in the preceding paragraph. Elevations of this type can e.g. be formed by dye lines applied to substrate 1a by means of intaglio printing.

In general, for good visual perception, the distance D (see FIG. 4) between neighboring non-intersecting edges formed by surface structure 6 should not exceed 1 cm.

In order to be readily visible, the surface structure is advantageously not formed by the edges of items applied to the substrate that are recognized as "separate" therefrom, such as a photograph.

In the above examples, surface structure 6 has been created by adding material to the surface of substrate 1a, and it has also been mentioned that the surface structure can be generated by embossing. It is also possible to manufacture or change the surface structure by flattening a rough or structured surface area of substrate 1a, e.g. by embossing parts of it with a flat stamp prior to the application of hologram layer 5. For example, the surface of substrate 1a may be a rough paper with the exception of those places where it has been flattened with the stamp. When applying hologram layer 5 to substrate 1a, it will be deformed inhomogeneously by the rough sections of its surface, which will generally degrade the angular and spectral selectivity of the hologram in those areas.

In the embodiments discussed so far, hologram layer 5 was deformed non-homogeneously by surface structure 6. Alternatively or in addition thereto, hologram layer 5 can also be non-homogeneously deformed by applying non-homogeneous pressure thereto, e.g. in an embossing process.

Figure 5:
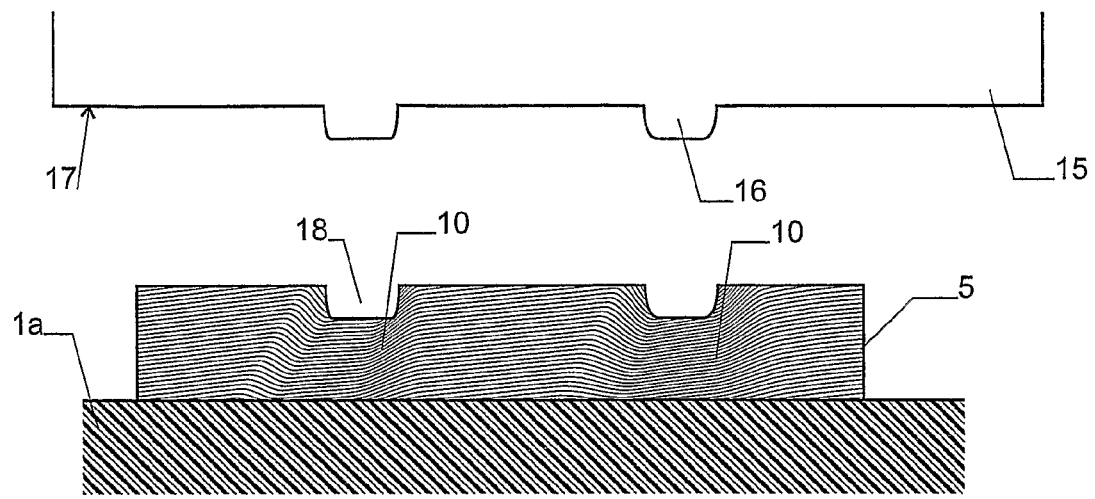
FIG. 5 is a sectional view through an embossed hologram layer and part of the substrate, the figure also schematically depicting the embossing stamp.

Such a procedure is depicted in FIG. 5, which shows hologram layer 5 on substrate 1a after embossing by a stamp 15. Stamp 15 comprises a surface structure 16 consisting e.g. of recesses or bumps at its impact side 17. Pressing stamp 15 against hologram layer 5 on substrate 1a (or prior to attaching hologram layer 5 onto substrate 1a) creates a corresponding non-homogeneous deformation 18 therein. This again leads to visually perceptible distortions 10 within volume hologram 7. To encourage deformation, hologram layer 5 can again be heated prior to and/or during embossing.

In the examples mentioned above, volume hologram 7 was, prior to deformation of hologram layer 5, homogeneous. As it is known to the person skilled in the art, volume hologram 7 can also be non-homogenous and represent a desired two- or three-dimensional image.

Hence, a visible structure in volume hologram 7 can either be written into the original hologram during manufacturing, or it can be caused by the inhomogeneous deformation of the hologram layer. By suitable combination the two patterns types, a further security feature can be created.

Figure 6:
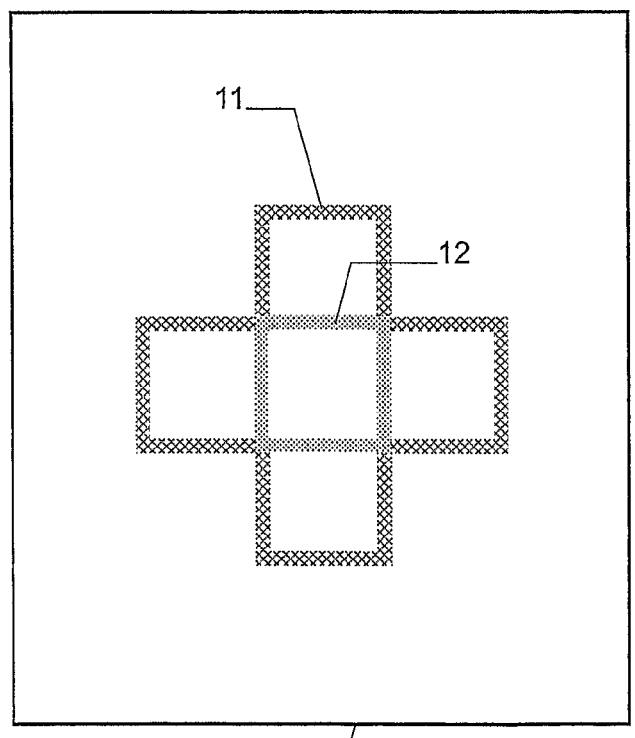
FIG. 6 is an example of a hologram comprising a first pattern formed by the undeformed hologram and a second pattern formed by the deformations.

This is shown in FIG. 6, where the cross-hatched area 11 depicts a first pattern that was written into the original hologram and visible therein without further distortion, while the dotted area 12 depicts a further pattern generated in homogeneous areas of the hologram by means of a local deformation of hologram layer 5. When deforming hologram layer 5, care is taken that the edges of first pattern 11 are collinear with the edges of second pattern 12. This allows the user to verify that hologram layer 5 has been applied correctly.

The areas 10 of inhomogeneous deformation in volume hologram 7 can have any desirable shape. Advantageously, they follow the contours of characters or geometric shapes that can be recognized easily.

The inhomogeneous deformations applied to the volume hologram can also be caused by a plurality of local deformations having extensions of a e.g. 50 µm or less in the directions parallel to the surface of the substrate. For example, a surface structure having random bumps or a cross hatching pattern can be used. Even though such structures are not individually recognizable, they distort the hologram in random manner. Thus, the reflections from the hologram have decreased angular and spectral selectivity, which can be recognized by a viewer and increases the visibility of the hologram under diffuse illumination.

The examples above relate to bank notes. However, the same mechanisms can also be used to mark other types of objects as mentioned in the introduction.

To verify the authenticity of an object comprising a deformed hologram as above, the following steps can be used:

1. Illuminating volume hologram 7 with light for generating a light field reflected therefrom. The illuminating light can be diffuse and does not need to be coherent.

2. Checking for the presence of at least one property of the reflected light field caused by the deformation-induced inhomogeneities 10. When checking the authenticity of the embodiment of FIG. 2, the property can e.g. be the visibility of colored reflections near the bumps of surface structure 6. In more general terms, the property will usually be any reflection (or absence of reflection) caused by the deformation of volume hologram 7.

3. If the property checked in step 2 is not found, the authenticity of the object can be negated.

While there are shown and described advantageous embodiments of the invention, it is to be distinctly understood that the invention is not limited thereto but may be otherwise variously embodied and practiced within the scope of the following claims.

The invention claimed is:

1. A method for manufacturing an anti-counterfeit security object, comprising the steps of
creating a volume hologram in a hologram layer,
applying the hologram layer to a substrate, and
non-homogeneously deforming the hologram layer thereby deforming the volume hologram,
wherein the hologram layer is applied at least partially over a surface structure of the substrate and deformed to match said surface structure thereby deforming said volume hologram, and
wherein said surface structure is not formed by edges of a photograph.

2. The method of claim 1, wherein the hologram layer is deformed locally.

3. The method of claim 1, wherein said surface structure comprises edges of at least 10 µm in height.

4. The method of claim 1, wherein said surface structure comprises edges of at least 30 µm in height.

5. The method of claim 1, wherein said surface structure comprises elevations having a width that does not exceed, at least in one direction, 1 mm.

6. The method of claim 1, wherein said surface structure comprises elevations having a width that does not exceed, at least in one direction, 300 µm.

7. The method of claim 1, wherein a distance between neighboring non-intersecting edges formed by said surface structure does not exceed 1 cm.

8. The method of claim 1, comprising the step of manufacturing at least part of said surface structure by embossing said substrate.

9. The method of claim 1, comprising the step of manufacturing at least part of said surface structure by locally applying material to a surface of said substrate and hardening said material.

10. The method of claim 1, comprising the step of applying said surface structure to said substrate by printing.

11. The method of claim 1, comprising the step of applying said surface structure to said substrate by intaglio printing.

12. The method of claim 1, comprising the step of flattening part of said surface structure prior to applying said hologram layer.

13. The method of claim 1, comprising the step of raising a temperature of the hologram layer for softening said hologram layer in contact with said surface structure.

14. The method of claim 1, comprising the step of deforming said hologram layer by embossing the hologram layer.

15. The method of claim 1, wherein the hologram layer is deformed in areas where the volume hologram is visually substantially homogeneous.

16. The method of claim 1, wherein said security object is a bank note.

17. A method for manufacturing an anti-counterfeit security object having a substrate and a volume hologram attached to the substrate, said method comprising the steps of
creating a volume hologram in a hologram layer, and
attaching the hologram layer to the substrate, wherein the hologram layer is applied at least partially over a surface structure of the substrate and thereby deformed non-homogeneously to match said surface structure, thereby deforming said volume hologram, and wherein said surface structure is not formed by edges of a photograph.

\* \* \* \* \*